(12) United States Patent
Kim et al.

(10) Patent No.: US 11,513,632 B2
(45) Date of Patent: Nov. 29, 2022

(54) TOUCH DISPLAY DEVICE, TOUCH DRIVING CIRCUIT AND TOUCH DRIVING METHOD THEREOF

(71) Applicant: LG DISPLAY CO., LTD., Seoul (KR)

(72) Inventors: Jung-Gyum Kim, Paju-si (KR); Minsung Kang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/403,295

(22) Filed: Aug. 16, 2021

(65) Prior Publication Data

US 2022/0137780 A1    May 5, 2022

(30) Foreign Application Priority Data

Nov. 2, 2020 (KR) .......................... 10-2020-0144474

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/0447* (2019.05); *G06F 3/04186* (2019.05)

(58) Field of Classification Search
CPC .. G06F 3/0447; G06F 3/0412; G06F 3/04182; G06F 3/04186; G06F 2203/04104
USPC ........................................................ 345/173
See application file for complete search history.

(56) References Cited

U.S. PATENT DOCUMENTS

| 2018/0004353 | A1* | 1/2018 | Shin | ..................... G02F 1/13338 |
| 2019/0187832 | A1* | 6/2019 | Lee | ........................ G06F 3/0412 |
| 2021/0117035 | A1* | 4/2021 | Kim | ....................... G06F 3/0416 |

* cited by examiner

*Primary Examiner* — Jimmy H Nguyen
(74) *Attorney, Agent, or Firm* — Polsinelli PC

(57) ABSTRACT

A touch display device comprises a display panel including a plurality of touch electrodes, and a plurality of touch lines; a touch sensing circuit configured to generate a digital touch sensing output signal by accumulating touch sensing signals transmitted from the plurality of touch electrodes through the plurality of touch lines; and a touch controller configured to control a amplification gain of the touch sensing circuit by extracting a plurality of single touch sensing data having touch peak values from the digital touch sensing output signal and by comparing a distance of touch peak values between adjacent single touch sensing data to a predetermined reference distance.

20 Claims, 15 Drawing Sheets

(a)  (b)  (c)

(a)

(b)

(c)

(a) Multi Touch (b) Broad Single Touch (a) Multi Touch (b) Broad Single Touch (a)

(b)

TOUCH DISPLAY DEVICE, TOUCH DRIVING CIRCUIT AND TOUCH DRIVING METHOD THEREOF

CROSS-REFERENCE TO RELATED APPLICATION

This application claims priority from Korean Patent Applications No. 10-2020-0144474, filed on Nov. 2, 2020, which is hereby incorporated by reference in its entirety for all purposes as if fully set forth herein.

BACKGROUND

Field of the Disclosure

The present disclosure relates to a touch display device, touch driving circuit and a touch driving method thereof.

Description of the Background

As the information society develops, the demand for display devices for displaying images is increasing in various forms. Recently, various display devices such as a liquid crystal display device, plasma display panel, and an organic light emitting display device have been used.

Among these display devices, there is a touch display device that provides a touch-based input function which allows a user to easily, intuitively and conveniently input information or commands by escaping from a conventional input method such as a button, a keyboard, and a mouse.

In order for such a touch display device to provide a touch-based input function, it is necessary to detect the presence of a user's touch and to accurately detect the touch coordinates.

Such a touch display device may be classified into a resistive method, a capacitance method, an ultrasonic method, an infrared method, and the like according to an operation method. In addition, recently, a touch display device has been implemented to recognize not only a single touch but also a multi-touch.

As an example of multi-touch, conventional method searches for a channel range in which a touch sensing signal greater than a reference value is generated by a touch input and sums magnitude of the touch sensing signals included in the range.

This method calculates the ratio of the magnitude of the touch sensing signals detected within a certain range and the sum of the touch sensing signals, and compares them to determine whether the touch input is a single touch or a multi-touch. This method may be described that it determines a multi-touch based on the fact that a signal between the multi-touch signals has a small value compared with the magnitude of the entire touch sensing signal.

However, this multi-touch method can cause a critical error to be recognized the multi-touch as a single touch because two touch sensing output signals overlap when the distance between two regions with touch detection is narrow.

Therefore, it is required to improve a function of the multi-touch method since it has a low resolution when the distance between two regions with touch detection is narrow.

SUMMARY

Accordingly, the present disclosure provides a touch display device, a touch driving circuit and a touch driving method thereof enable to improve a resolution for multi-touch.

In addition, the present disclosure provides a touch display device, a touch driving circuit and a touch driving method thereof enable to improve a resolution for multi-touch by varying an amplification gain of a touch sensing signal according to a distance of touch peak values between adjacent touch sensing signals.

In addition, the present disclosure provides a touch display device, a touch driving circuit and a couth driving method thereof enable to improve a resolution for multi-touch by increasing the amplification gain of the touch sensing signal when the distance between the touch peak values of adjacent touch sensing signals is within the reference distance.

According to an aspect, the present disclosure provides a touch display device comprising: a display panel including a plurality of touch electrodes, and a plurality of touch lines; a touch sensing circuit configured to generate a digital touch sensing output signal by accumulating touch sensing signals transmitted from the plurality of touch electrodes through the plurality of touch lines; and a touch controller configured to control a amplification gain of the touch sensing circuit by extracting a plurality of single touch sensing data having touch peak values from the digital touch sensing output signal and by comparing a distance of touch peak values between adjacent single touch sensing data to a predetermined reference distance.

According to an aspect, the touch sensing circuit includes a preamplifier having an operational amplifier to which the touch sensing signal supplied to an inverting input terminal and a reference voltage supplied to an non-inverting input terminal, a plurality of feedback capacitors connected in parallel between the inverting input terminal and an output terminal of the operational amplifier, and a gain control switch to select the plurality of feedback capacitors; an integrator having a plurality of switches and a plurality of capacitors in order to accumulate an output signal of the preamplifier; a sampling circuit configured to transmit an output signal of the integrator; and an analog-to-digital converter configured to convert an output signal of the sampling circuit into the digital touch sensing data.

According to an aspect, the reference voltage is fixed value or variable signal.

According to an aspect, the reference voltage is same signal as a load free driving signal supplied to the plurality of touch electrodes.

According to an aspect, the amplification gain of the touch sensing circuit is larger than the variation of the reference voltage.

According to an aspect, the touch controller includes a touch sensing signal preprocessor configured to process the digital touch sensing output in order to detect a touch; and a touch peak value distance comparator configured to extract a plurality of single touch sensing data having touch peak values from the data processed in the touch sensing signal preprocessor, and control the amplification gain of the touch sensing circuit according to a distance of the touch peak values between adjacent single touch sensing data.

According to an aspect, the touch peak value distance comparator is configured to increase the amplification gain of the touch sensing circuit when the distance of touch peak values between adjacent single touch sensing data is smaller than a reference distance.

According to an aspect, the touch peak value distance comparator is configured to increase the amplification gain of the operational amplifier by selecting a feedback capacitor having a large capacity from among the plurality of feedback capacitors connected to the operational amplifier when the distance between the touch peak values of the adjacent single touch sensing data is greater than a reference distance Device.

According to an aspect, the touch peak value distance comparator is configured to maintain the amplification gain of the touch sensing circuit when the distance of touch peak values between adjacent single touch sensing data is greater than a reference distance.

According to an aspect, the touch controller further includes at least one filter configured to remove noise from data transmitted from the touch peak value distance comparator.

According to an aspect, the touch controller uses a median filter when the distance of the touch peak values between adjacent single touch sensing data is smaller than a reference distance.

According to an aspect, the touch controller uses an average filter when the distance of the touch peak values between adjacent single touch sensing data is greater than a reference distance.

According to another aspect, aspects of the present disclosure provides a touch driving circuit comprising: a touch sensing circuit configured to connect to a plurality of touch electrodes in a display panel through a plurality of touch lines and generate a digital touch sensing output signal by accumulating touch sensing signals transmitted from the plurality of touch electrodes through the plurality of touch lines; and a touch controller configured to control a amplification gain of the touch sensing circuit by extracting a plurality of single touch sensing data having touch peak values from the digital touch sensing output signal and by comparing a distance of touch peak values between adjacent single touch sensing data to a predetermined reference distance.

According to another aspect, aspects of the present disclosure provides a touch driving method for detecting touch presence or touch coordinates by receiving touch sensing signals from a plurality of touch electrodes disposed on a display panel, comprising: generating a digital touch sensing output signal by accumulating the touch sensing signals; processing the digital touch sensing output signal to detect a touch; extracting a plurality of single touch sensing data having touch peak values from the processed data, and determining a distance of touch peak values between adjacent single touch sensing data; comparing the distance of touch peak values between adjacent single touch sensing data to a reference distance; and increasing an amplification gain of the touch sensing signal when the distance of touch peak values between adjacent single touch sensing data is smaller than the reference distance.

According to another aspect, the touch driving method further comprises maintaining the amplification gain of the touch sensing signal when the distance of touch peak values between adjacent single touch sensing data is greater than the reference distance.

According to another aspect, the touch driving method further comprises applying a median filter for removing noise of the digital touch sensing output signal when the distance of touch peak values between adjacent single touch sensing data is smaller than the reference distance.

According to exemplary aspects, the present disclosure provides a touch display device, a touch driving circuit and a touch driving method thereof enable to improve a resolution for multi-touch.

According to exemplary aspects, the present disclosure provides a touch display device, a touch driving circuit and a touch driving method thereof enable to improve a resolution for multi-touch by varying an amplification gain of a touch sensing signal according to a distance of touch peak values between adjacent touch sensing signals.

According to exemplary aspects, the present disclosure provides a touch display device, a touch driving circuit and a couth driving method thereof enable to improve a resolution for multi-touch by increasing the amplification gain of the touch sensing signal when the distance between the touch peak values of adjacent touch sensing signals is within the reference distance.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
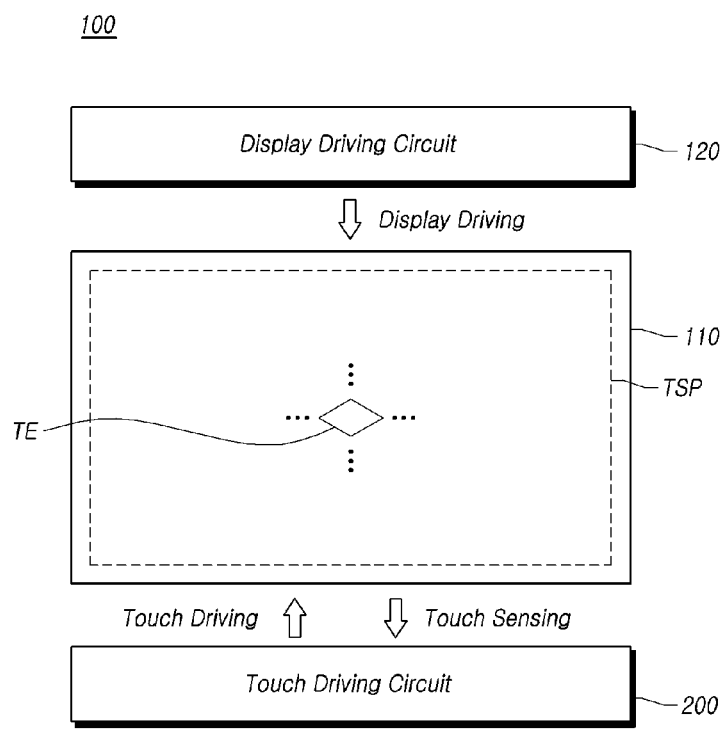
FIG. 1 illustrates a block diagram of a touch display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 illustrates a block diagram of a touch display device according to aspects of the present disclosure.

Referring to FIG. 1, the touch display device 100 according to aspects of the present disclosure may have a function of displaying images and a function of sensing a touch from a user.

In order to implement both a function of displaying the images and a function of sensing a touch, the touch display device 100 may include a display panel 110 in which a plurality of data lines and a plurality of gate lines are arranged, a display driving circuit 120 for driving the display panel 110, and the like.

In terms of functionality, the display driving circuit 120 may include a data driving circuit for driving the data lines, a gate driving circuit for driving the gate lines, and a controller for controlling the data driving circuit and the gate driving circuit. The display driving circuit 120 may be implemented as one or more integrated circuits.

The touch display device 100 may include a touch screen panel TSP in which a plurality of touch electrodes TE for sensing touches are arranged, and a touch driving circuit 200 for driving the touch screen panel TSP and processing signals related to touches.

The touch screen panel TSP in the touch display device 100 may be an external type in which the touch screen panel TSP is manufactured separately from the display panel 110 and thereafter bonded with the display panel 110, or an embedded type in which the touch screen panel TSP is manufactured together with the display panel 110 and located inside of the display panel 110.

Thus, the touch screen panel TSP in the touch display device 100 according to aspects may be an independent panel having a function of sensing a touch, or a display panel 110 having a function of displaying together with the function of sensing a touch. Hereinafter, for convenience of description, it is assumed that the display panel 110 includes the touch screen panel TSP.

The touch driving circuit 200 may provide a touch driving signal to the display panel 110 for driving the display panel 110, receive a touch sensing signal from the display panel 110, and detect a touch presence or a touch coordinate based on the touch sensing signal.

The touch driving circuit 200 may include a touch sensing circuit for providing the touch driving signal and receiving the touch sensing signal, and a touch controller for detecting the touch presence or calculating the touch coordinate.

The touch driving circuit 200 may be implemented as one or more components like integrated circuits, or implemented separately from the display driving circuit 120.

Further, all or at least a part of the touch driving circuit 200 may be implemented by being integrated with the display driving circuit 120 or an inner circuit of the display driving circuit 120. For example, the touch sensing circuit of the touch driving circuit 200 may be implemented as an integrated circuit with the data driving circuit of the display driving circuit 120.

In addition, the touch controller may be located within the touch driving circuit 200 or may be disposed outside the touch driving circuit 200 in the form of a separate control unit.

Meanwhile, the touch display device 100 may sense the touch presence or the touch coordinate based on capacitance formed by touch electrodes TE.

The touch display device 100 may sense a touch by a mutual-capacitance scheme or a self-capacitance scheme, as a capacitance based touch sensing scheme.

In case of a touch sensing scheme based on mutual-capacitance, a plurality of touch electrodes TE may be classified as touch driving electrodes which is supplied touch driving signals through touch driving lines, and touch sensing electrodes which forms capacitances with the touch driving electrodes and supplies touch sensing signals through touch sensing lines. Here, the touch driving lines and the touch sensing lines may be referred to as touch lines.

In case of the touch sensing scheme based on mutual-capacitance, the touch presence and the touch coordinate may be detected based on a change of mutual-capacitance formed between the touch driving electrode and the touch sensing electrode according to a presence or absence of a pointer such as a finger, a pen, or the like.

In case of the touch sensing scheme based on self-capacitance, each touch electrode serves as both the touch driving electrode and the touch sensing electrode. That is, a touch driving signal is supplied to a touch electrode TE through a touch line, and a touch sensing signal generated in the touch electrode, to which the touch driving signal is supplied, is transmitted through the same touch line. Accordingly, in case of the touch sensing scheme based on self-capacitance, there is no distinction between the touch driving electrode and the touch sensing electrode and no distinction between the touch driving line and the touch sensing line.

In case of the touch sensing scheme based on self-capacitance, the touch presence and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Further, such a touch display device 100 may be various types of display devices, such as a liquid crystal display device, an organic light emitting display device, a plasma display panel, a quantum dot display device, and the like.

Figure 2:
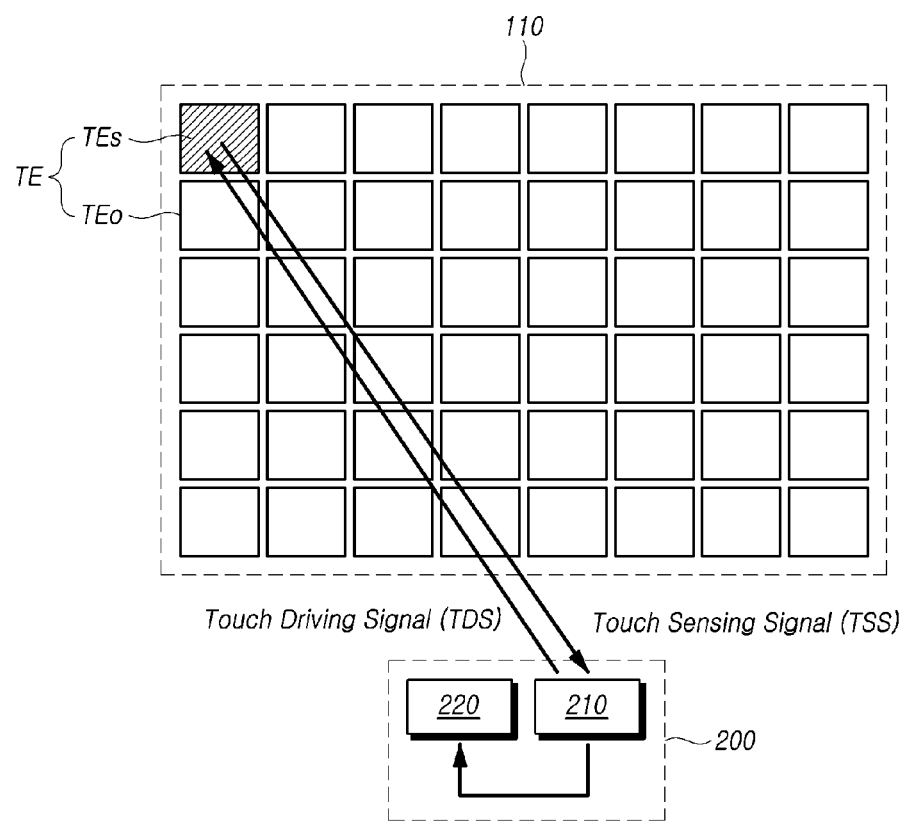
FIG. 2 illustrates an example of touch driving and sensing operations in the touch display device according to aspects of the present disclosure.

FIG. 2 illustrates an example of touch driving and sensing operations in the touch display device according to aspects of the present disclosure.

Referring to FIG. 2, the touch display device 100 according to aspects of the present disclosure includes a plurality of touch electrodes TE serving as a touch sensor to provide a touch sensing function, a touch driving circuit 200 detecting a touch by sequentially driving the touch electrodes TE, and the like.

The touch driving circuit 200 may detect the touch presence and a touch coordinate by sequentially driving and sensing a plurality of touch electrodes TE in a touch sensing period in which touch sensing is performed.

More specifically, the touch driving circuit 200 may select at least one touch electrode among a plurality of touch electrodes TE as a touch electrode TEs to be sensed, and provide a touch driving signal TDS to the selected touch electrode TEs. Thereafter, the touch driving circuit 200 may detect the touch presence or a touch coordinate by determining a change in capacitance (or a change in voltage, a change in an amount of charge, or the like) for each touch electrode TE based on touch sensing signals TSS received from the selected touch electrode TEs and non-selected touch electrode TEo.

The touch driving circuit 200 may include, for example, a touch controller 220 controlling a generation of signals related to touch detection, and performing a process for detecting a touch presence and calculating a touch coordinate, and a touch sensing circuit 210 providing the touch driving signal TDS to the display panel 110, detecting the touch sensing signal TSS from the touch electrode TEs to which the touch driving signal TDS is provided, and providing the detected the touch sensing signal TSS to the touch controller 220.

Here, the touch sensing period for detecting a touch may be separated in time from a display driving period in which images are displayed on the display panel 110, or be concurrently performed with the display driving period.

Further, a load-free driving process for reducing parasitic capacitance formed through at least one touch electrode TE may be performed by providing an alternating current signal with the same phase and amplitude as the touch driving signal TDS to at least one data line and at least one gate line of the display panel 110 in the touch sensing period. In this case, the touch driving signal TDS may correspond to a load-free driving signal.

Figure 3:
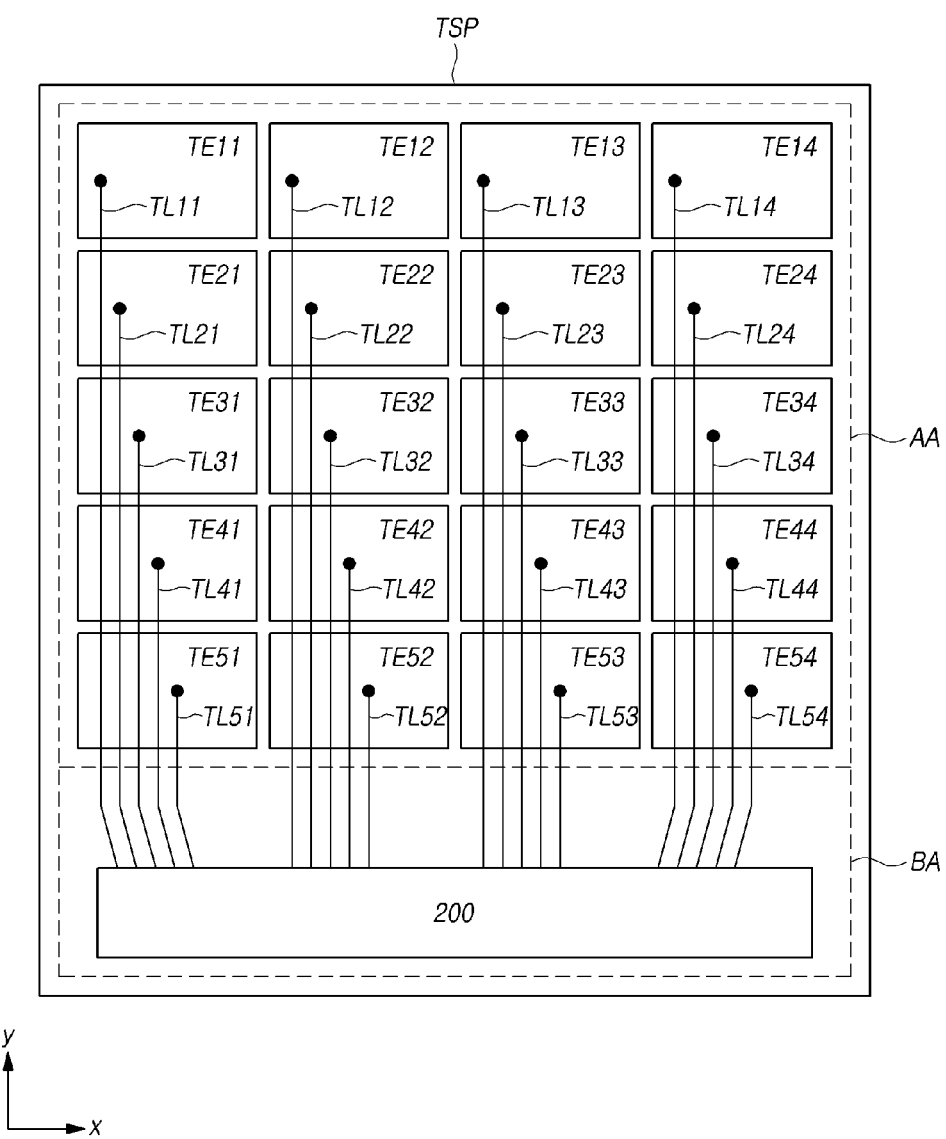
FIG. 3 illustrates a touch panel in a touch display device to which the self-capacitance based touch sensing scheme is applied according to aspects of the present disclosure.

FIG. 3 illustrates a touch panel in a touch display device to which the self-capacitance based touch sensing scheme is applied according to aspects of the present disclosure.

Referring to FIG. 3, the touch display device 100 to which the self-capacitance based touch sensing scheme is applied according to aspects of the present disclosure includes a display panel 110 on which a plurality of touch electrodes TE and a plurality of touch lines TL are arranged, and a touch driving circuit 200 providing touch driving signals TDS to the touch electrodes TE and receiving touch sensing signals TSS from the touch electrodes TE.

The touch display device 100 may include an active area AA in which the plurality of touch electrodes TE11-TE54 are arranged and a non-active area, such as a bezel area BA, located outside of the active area AA, on which the touch driving circuit 200 is located.

Here, an example of the touch electrodes TE arranged in 5 rows and 4 columns in the display panel 110 is discussed; however, this is just one example for convenience of description. For example, touch electrodes TE may be arranged in various structures in the display panel 110.

The plurality of touch electrodes TE1 are arranged in a first direction x and a second direction y intersecting the first direction x in the active area AA, and a plurality of touch lines TL11-TL54 are connected to the plurality of touch electrodes TE1 respectively. The plurality of touch lines TL11-TL54 extends to the bezel area BA from the active area AA in the second direction y and is connected to the touch driving circuit 200.

More specifically, a 1-1 touch line TL11 is connected to a touch electrode TE11 in a first row and a first column. The 1-1 touch line TL11 extends to the bezel area BA from the active area AA in the second direction y and is connected to the touch driving circuit 200. Further, a 2-1 touch line TL21 is connected to a touch electrode TE21 in a second row and the first column. The 2-1 touch line TL21 extends to the bezel area BA from the active area AA in parallel with the 1-1 touch line TL11 and is connected to the touch driving circuit 200. Likewise, a 3-1 touch line TL31 connected to a touch electrode TE31 in a third row and the first column, a 4-1 touch line TL41 connected to a touch electrode TE41 in a fourth row and the first column, and a 5-1 touch line TL51 connected to a touch electrode TE51 in a fifth row and the first column extend to the bezel area BA from the active area AA in parallel with the 1-1 touch line TL11 and the 2-1 touch line TL21, and are connected to the touch driving circuit 200.

Likewise, a touch electrode TE12 in the first row and a second column to a touch electrode TE52 in the fifth row and the second column, which are arranged in the second column, are connected to a 1-2 touch line TL12 to a 5-2 touch line TL52, respectively. The 1-2 touch line TL12 to the 5-2 touch line TL52 extend to the bezel area BA from the active area AA in parallel with one another, and are connected to the touch driving circuit 200.

Further, a touch electrode TE13 in the first row and a third column to a touch electrode TE53 in the fifth row and the third column, which are arranged in the third column, are also connected to a 1-3 touch line TL13 to a 5-3 touch line TL53, respectively. The 1-3 touch line TL13 to the 5-3 touch line TL53 extend to the bezel area BA from the active area AA in parallel with one another, and are connected to the touch driving circuit 200.

Further, a touch electrode TE14 in the first row and a fourth column to a touch electrode TE54 in the fifth row and the fourth column, which are arranged in the fourth column, are also connected to a 1-4 touch line TL14 to a 5-4 touch line TL54, respectively. The 1-4 touch line TL14 to the 5-4 touch line TL54 extend to the bezel area BA from the active area AA in parallel with one another, and are connected to the touch driving circuit 200.

Such a touch display device 100 may be implemented as an organic light emitting display device. The organic light emitting display device includes a plurality of sub-pixels defined by a plurality of gate lines and a plurality of data lines. Each of the sub-pixels includes an organic light emitting diode that is a self-emissive, and the organic light emitting diode includes an anode electrode, a cathode electrode, and an organic compound layer interposed between them.

The organic compound layer may further include a hole-related layer and an electron-related layer, together with an emission layer. The hole-related layer may include a hole injection layer HIL and a hole transport layer HTL, and the electron-related layer may include an electron injection layer EIL and an electron transport layer ETL.

In a case where the touch display device 100 according to aspects of the present disclosure is an organic light emitting display device, the display panel 110 may have a top emission structure in which light is guided to travel upwardly or a bottom emission structure in which light is guided to travel downwardly.

In the case of the touch display device 100 that is the organic light emitting display device, a plurality of touch electrodes TE is included in the display panel 110, and may be disposed on an encapsulation layer located over a transistor and an organic light emitting diode. Such an arrangement of the touch electrodes TE may be more suitable for the top emission structure.

In the case of the touch display device 100 that is the organic light emitting display device, the plurality of touch electrodes TE may be arranged on a substrate of the display panel 110, on which a thin film transistor (TFT) is disposed. For example, the plurality of touch electrodes TE may be an anode electrode of an organic light emitting diode included in the display panel 110, an electrode formed on an layer equal to the anode electrode, or an electrode located on at least one of various layers located over or under the anode electrode. Like this, a configuration in which the touch electrode TE is disposed over the substrate on which the thin film transistor is formed is more suitable for a case where the display panel 110 has the bottom emission structure.

A plurality of touch electrodes TE included in the touch display device 100 according to aspects of the present disclosure may be formed in a plate type not having an opening, or a mesh type having openings for luminous efficiency of a subpixel. The plurality of touch electrodes TE may be transparent electrodes, or further include one or more transparent electrodes for luminous efficiency of sub-pixels. The plurality of touch electrodes TE included in the touch display device 100 according to aspects of the present disclosure may be dedicated electrodes for touch sensing, or electrodes used for both display driving and the touch sensing.

In the case of multi-touch in which two fingers simultaneously contact the display panel 110, the touch display device 100 according to aspects of the present disclosure may improve a resolution for multi-touch even when the distance between the two fingers is small.

Figure 4:
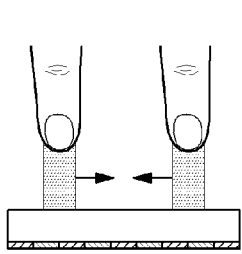
FIG. 4 and FIG. 5 illustrate exemplary diagrams of a change in the resolution of a touch sensing output signal according to a distance between multi-touch in the touch display device according to aspects of the present disclosure.
Figure 4:
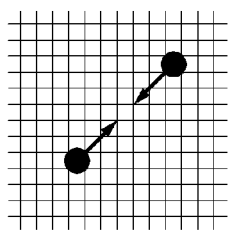
Figure 4:
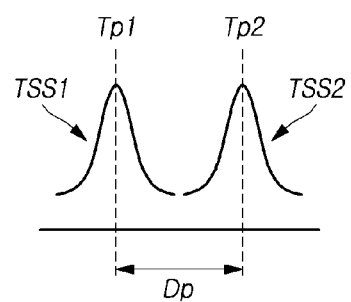
Figure 5:
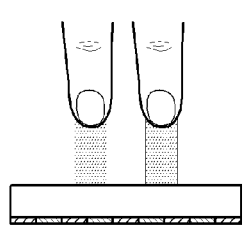
Figure 5:
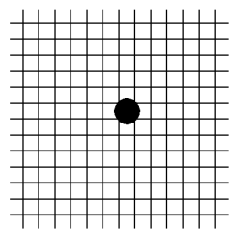
Figure 5:
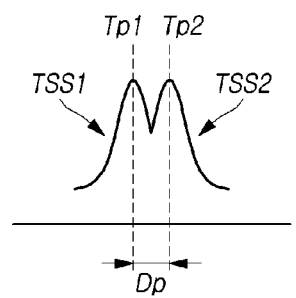

FIG. 4 and FIG. 5 illustrate exemplary diagrams of a change in the resolution of a touch sensing output signal according to a distance between multi-touch in the touch display device according to aspects of the present disclosure.

Here, FIG. 4 illustrates a case where the distance between two fingers for multi-touch is large, and FIG. 5 illustrates a case where the distance between two fingers for multi-touch is small. Here, it illustrates a passive touch using a finger as an example, but the same may be applied to a case of an active touch using a stylus.

Referring to FIG. 4, when the distance between two fingers in contact with the display panel 110 is large, the touch peak values Tp1, Tp2 of the touch sensing signals TSS1, TSS2 transmitted from the touch electrodes TE may be detected as an interval corresponding to the distance between the two fingers.

Since the distance Dp between two touch sensing signals TSS1, TSS2 by two fingers has a sufficient distance, it may be recognized to different touches, that is, multi-touch.

On the other hand, an operation of gathering two fingers closer together or spreading them in contact with the display panel 100 may be performed using a multi-touch function in the touch display device 100. For example, the operation of gathering two fingers in contact with the display panel 110 may be an operation of downsizing the screen displayed on the display panel 110, and the operation of spreading the two fingers in contact with the display panel 110 may be an operation of enlarging the screen displayed on the display panel 110.

As shown in FIG. 5, when two fingers are gathered together in contact with the display panel 110, the touch peak value Tp1, Tp2 of the touch sensing signals TSS1, TSS2 transmitted from the touch electrodes TE may be close to each other as the interval corresponding to the distance between the two fingers.

Accordingly, the distance Dp between the touch sensing signals TSS1, TSS2 by two fingers gradually decreases. When the distance Dp between the touch sensing signals TSS1, TSS2 is close to each other within a certain distance, it is difficult to distinguish whether it is a touch sensing signal of a single touch or a touch sensing signal of a multi-touch because the touch peak values Tp1, Tp2 of the touch sensing signals TSS1, TSS2 by two fingers are adjacent to each other.

Figure 6:
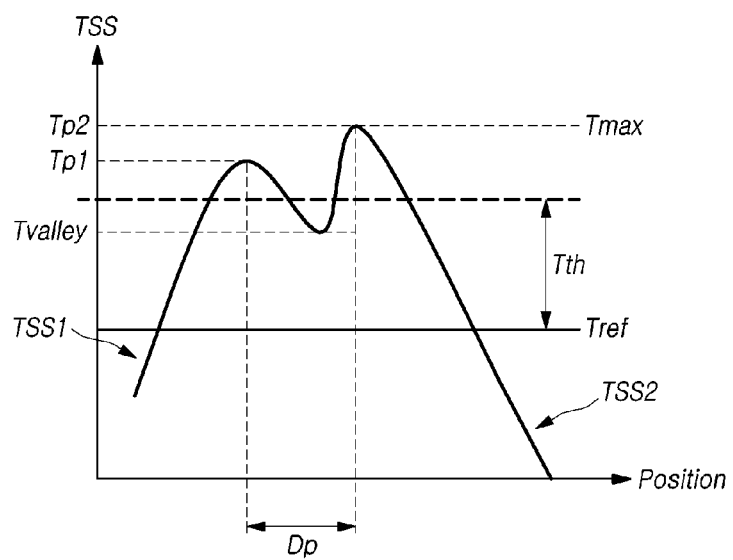
FIG. 6 illustrates an exemplary diagram for explaining a parameter for a touch sensing signal in a touch display device according to aspects of the present disclosure.

FIG. 6 illustrates an exemplary diagram for explaining a parameter for a touch sensing signal in a touch display device according to aspects of the present disclosure.

Referring to FIG. 6, the touch sensing signals TSS1, TSS2 transmitted from the display panel 110 appear in the form of a Gaussian distribution or a normal distribution depending on a capacitance formed between the finger and the touch electrode TE in the touch display device 100 according to aspects of the present disclosure.

At this time, when the distance between the two fingers becomes close, the touch sensing signals TSS1, TSS2 appear in the form that the touch peak values Tp1, Tp2 have a valley between them since some sections of the touch sensing signals TSS1, TSS2 by two fingers are overlapped.

Accordingly, the touch sensing signals TSS1, TSS2 by adjacent multi-touch have a valley value Tvalley smaller than the first touch peak value Tp1 and the second touch peak value Tp2 between the first touch peak value Tp1 and the second peak value Tp2.

At this time, the distance Dp of the touch peak values Tp1, Tp2 between the touch sensing signals TSS1, TSS2 may correspond to the distance between two fingers in contact with the display panel 110.

Meanwhile, the touch presence may be determined according to whether the touch sensing signal TSS is greater than the touch threshold value Tth with a certain magnitude from a touch reference value Tref. Accordingly, a touch presence may be determined when the touch sensing signals TSS1, TSS2 having a value greater than the touch threshold value Tth from the touch reference value Tref are detected.

The touch reference value Tref and the touch threshold value Tth may be fixed values, or the touch reference value Tref and the touch threshold value Tth may be varied in order to control the touch sensing sensitivity for single touch or multi-touch.

Figure 7:
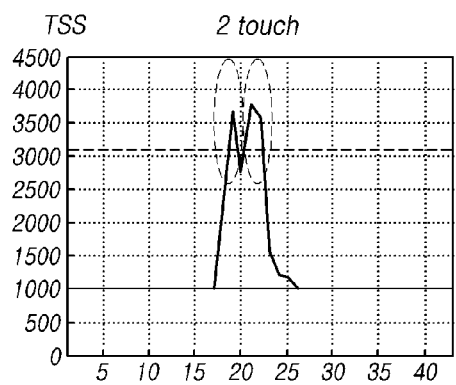
FIG. 7 illustrates an exemplary signal waveform in which a multi-touch is determined in a state where a touch reference value and a touch threshold value are fixed in the touch display device according to aspects of the present disclosure.
Figure 7:
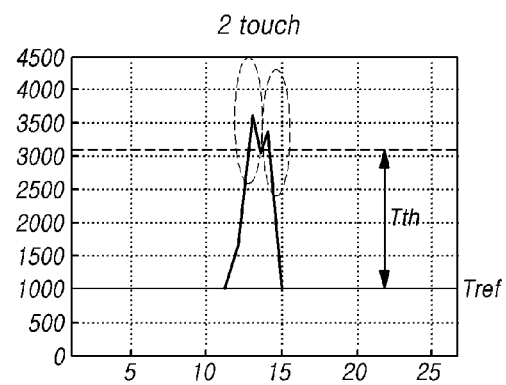
Figure 8:
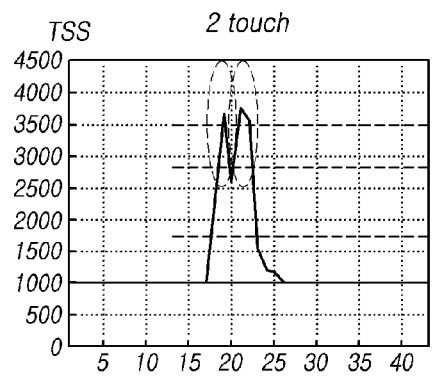
FIG. 8 illustrates an exemplary signal waveform in which a multi-touch is determined in a state where a touch reference value and a touch threshold value are varied in the touch display device according to the aspects of present disclosure.
Figure 8:
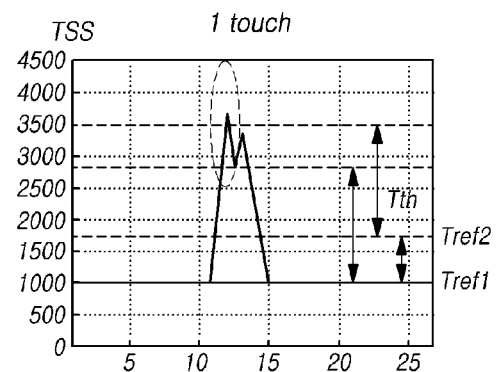

FIG. 7 illustrates an exemplary signal waveform in which a multi-touch is determined in a state where a touch reference value and a touch threshold value are fixed in the touch display device according to aspects of the present disclosure, and FIG. 8 illustrates an exemplary signal waveform in which a multi-touch is determined in a state where a touch reference value and a touch threshold value are varied in the touch display device according to the aspects of present disclosure.

Referring to FIG. 7 and FIG. 8, it can be seen that the distribution of the touch sensing signal TSS appears similarly in the case of a multi-touch in which two fingers touch an adjacent position (in the case (a) of FIG. 7 and the case (a) of FIG. 8), and in the case of a wide single touch in which one finger touches a wide area (in the case (b) of FIG. 7 and the case (b) of FIG. 8).

In other words, when the distance between two fingers in multi-touch is close, it is difficult to determine whether it is a wide single touch or a multi-touch since the touch sensing signal TSS is detected in a form similar to that of a wide single touch that uses one finger to touch a wide area.

At this time, when the touch reference value Tref and the touch threshold value Tth are fixed as shown in FIG. 7, there may be cases where the wide single touch is recognized as a multi-touch since the two touch peak values by the wide single touch are greater than the touch threshold value Tth from the touch reference value Tref.

On the other hand, the touch reference value Tref may be not fixed but varied as shown in FIG. 8. The touch reference value Tref may be a fixed reference signal compared with the touch sensing signal TSS to detect a touch, or may be a variable signal such as a pulse-shaped binary value or a sine wave.

As described above, when the touch reference value Tref is changed, the touch determination level to which the touch threshold value Tth is applied from the touch reference value Tref is also changed. Accordingly, it can be determined as a multi-touch by separately recognizing the two touch peak values from a wide single touch, but in some cases, it can be determined as a single touch by recognizing only one touch peak value from the wide single touch.

As described above, when the touch reference value Tref is variable, it may be difficult to detect a touch effectively because the wide area single touch may be recognized as a multi-touch or as a single touch depending on the level of the touch reference value Tref.

Accordingly, the touch display device 100 according to aspects of the present disclosure may improve the resolution for multi-touch by controlling the amplification gain of the touch sensing signal according to a distance between the touch peak values of the touch sensing signal.

Figure 9:
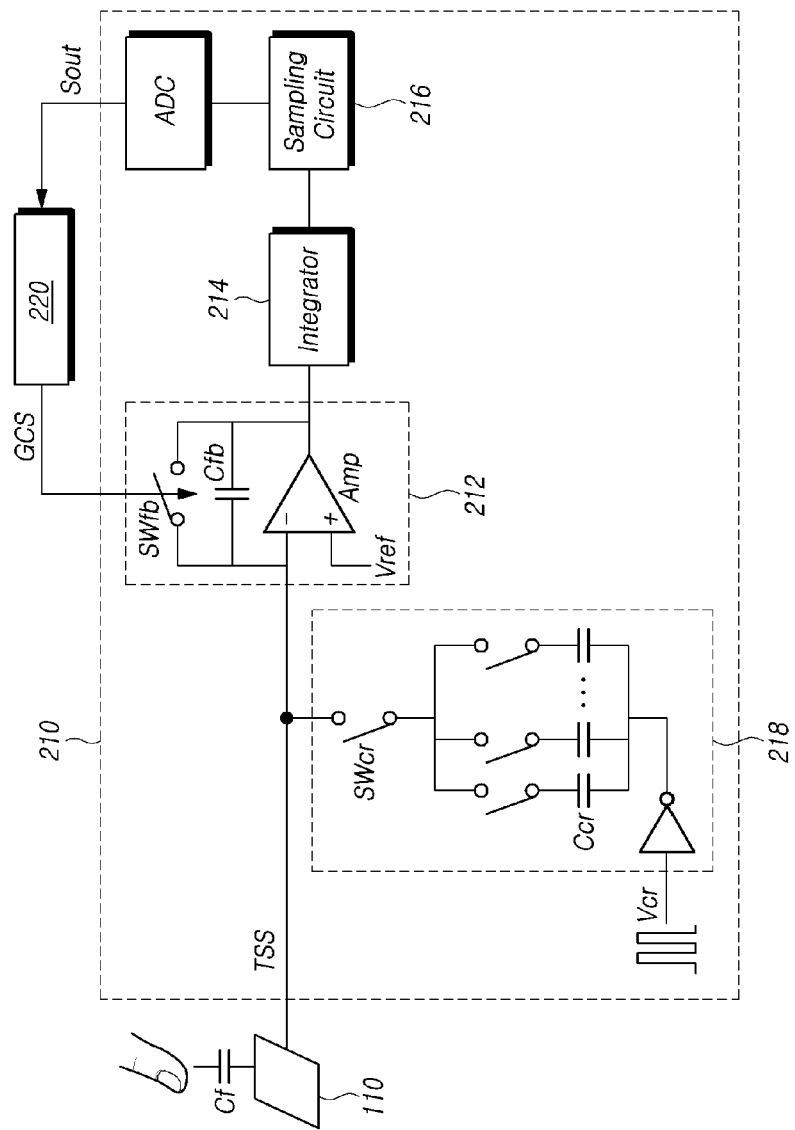
FIG. 9 illustrates a block diagram of a touch driving circuit in a touch display device according to aspects of the present disclosure.

FIG. 9 illustrates a block diagram of a touch driving circuit in a touch display device according to aspects of the present disclosure.

Referring to FIG. 9, the touch driving circuit 200 in the touch display device 100 according to aspects of the present disclosure may perform a touch sensing operation using switched-capacitor circuits which is configured as a charge transferring method.

The touch driving circuit 200 may include a touch sensing circuit 210 and a touch controller 220. The touch sensing circuit 210 may include a preamplifier 212, an integrator 214, a sampling circuit 216, and a charge remover 218.

An analog-to-digital converter ADC for converting a detection voltage for the touch sensing signal TSS into a digital value may be connected to an output terminal of the sampling circuit 216.

The preamplifier 212 may include an operational amplifier Amp to which the touch sensing signal TSS corresponding to the finger capacitance Cf formed between the display panel 110 and the finger is supplied to the inverting input terminal (−), a feedback capacitor Cfb and a feedback switch SWfb connected in parallel between the inverting input terminal (−) and the output terminal of the operational amplifier Amp.

A reference voltage Vref for comparing with the touch sensing signal TSS is supplied to the non-inverting input terminal (+) of the operational amplifier Amp. The output signal of the preamplifier 212 is transmitted to the integrator 214.

At this time, the reference voltage Vref supplied to the operational amplifier Amp of the preamplifier 212 is a signal corresponding to the touch reference value Tref, and may be a fixed value, a sine wave with a constant frequency, or a rectangular wave in the form of a pulse. Also, the peak-to-peak value of the reference voltage Vref may be same as or different from the peak-to-peak value of the touch driving signal TDS.

The integrator 214 may include a plurality of switches and capacitors in order to accumulate the output signal of the preamplifier 212. The switches and capacitors may be changed into various structures.

The sampling circuit 216 may include a capacitor capable of charging the output signal of the integrator 214, and transmit the voltage charged in the capacitor to the analog-to-digital converter ADC by operation of an internal switch.

Meanwhile, the touch driving circuit 200 may include a charge remover 218 for removing an initial charge remained in the inverted input terminal (−) of the preamplifier 212. When the capacitance of the touch electrode TE increases as in the large screen display panel 110, the output signal of the preamplifier 212 may increase and it causes the touch driving circuit 200 to saturate out of the allowable range. Therefore, the charge remover 218 for removing the saturated charge may be connected to a front part of the preamplifier 212.

The charge remover 218 may have a structure in which a plurality of capacitors Ccr are connected in parallel, and a pulse voltage Vcr for charge removal is supplied thereto.

The digital touch sensing output signal Sout transmitted from the analog-to-digital converter ADC is supplied to the touch controller 220. The touch controller 220 calculates the distance between the touch peak values in the digital touch sensing output signal Sout and determines whether the distance between the touch peak values of adjacent touch sensing signals is less than a reference distance.

As a result of the determination, when the distance between the touch peak values of adjacent touch sensing signals is less than the reference distance, the touch controller 220 increases the amplification gain of the operational amplifier Amp by controlling the feedback capacitor Cfb connected to the operational amplifier Amp of the preamplifier 212 using a gain control signal GCS.

At this time, the amplification gain of the operational amplifier Amp constituting the preamplifier 212 corresponds to a ratio Cfb/Cf of the finger capacitance Cf formed by a finger in the display panel 110 and the charge amount of the feedback capacitor Cfb connected to the operational amplifier Amp. Therefore, it is possible to increase the amplification gain of the operational amplifier Amp by connecting the feedback capacitor Cfb having a large capacitance between the inverting input terminal (−) and the output terminal of the operational amplifier Amp.

At this time, the range for increasing the amplification gain of the operational amplifier Amp may be larger than the variation of the reference voltage Vref so that the wide single touch may be distinguished from the multi-touch even if the reference voltage Vref is changed.

As described above, when the distance between the touch peak values of adjacent touch sensing signals is less than the reference distance, the touch peak value of the touch sensing signal TSS increases if the touch controller 220 increases the amplification gain of the operational amplifier Amp through the gain control signal GCS. Accordingly, it is possible to determine whether the adjacent touch sensing signals TSS1, TSS2 within a range less than the reference distance are the wide single touch or the multi-touch.

For the purpose above, the feedback capacitor Cfb connected to the operational amplifier Amp of the preamplifier 212 may be comprised of a plurality of capacitors connected in parallel in order to be selected by the gain control signal ACS transmitted from the touch controller 220.

Figure 10:
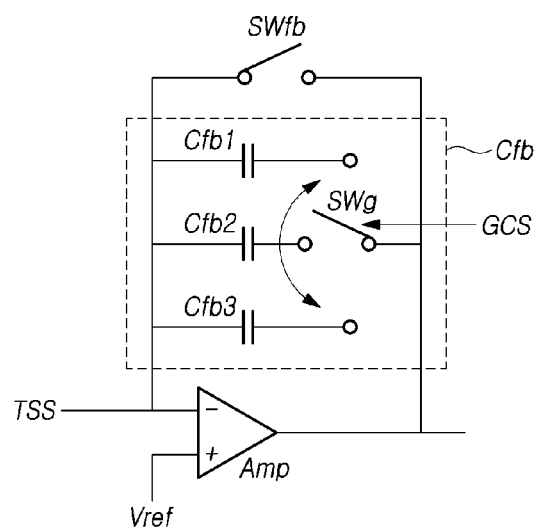
FIG. 10 illustrates an exemplary circuit diagram of a preamplifier to which a plurality of feedback capacitors to be selected according to the gain control signal are connected in the touch display device according to aspects of the present disclosure.

FIG. 10 illustrates an exemplary circuit diagram of a preamplifier to which a plurality of feedback capacitors to be selected according to the gain control signal are connected in the touch display device according to aspects of the present disclosure.

Referring to FIG. 10, the preamplifier 212 constituting the touch sensing circuit 210 in the touch display device 100 according to aspects of the present disclosure may include an operational amplifier Amp to which the touch sensing signal TSS corresponding to the finger capacitance Cf formed between the display panel 110 and the finger is supplied to the inverting input terminal (−), a plurality of feedback capacitors Cfb1, Cfb2, Cfb3 and a feedback switch SWfb connected in parallel between the inverting input terminal (−) and the output terminal of the operational amplifier Amp.

Only one of the plurality of feedback capacitors Cfb1, Cfb2, Cfb3 may be selected by the gain control switch SWg, and the amplification gain of the operational amplifier Amp may be changed by the charge amount in the selected one capacitor.

Meanwhile, although it illustrates a case as an example that the feedback switch SWfb is connected in parallel with the feedback capacitor Cfb, the gain control switch SWg may serve as the feedback switch SWfb. In this case, the gain control switch SWg may be connected to a feedback line in which the feedback switch SWfb is omitted, and one of the first feedback capacitor Cfb1, the second feedback capacitor Cfb2, and the third feedback capacitor Cfb3 according to the gain control signal GCS of the touch controller 220.

The reference voltage Vref for comparing with the touch sensing signal TSS is supplied to the non-inverting input terminal (+) of the operational amplifier Amp, and the output signal of the preamplifier 212 is transmitted to the integrator 214.

Figure 11:
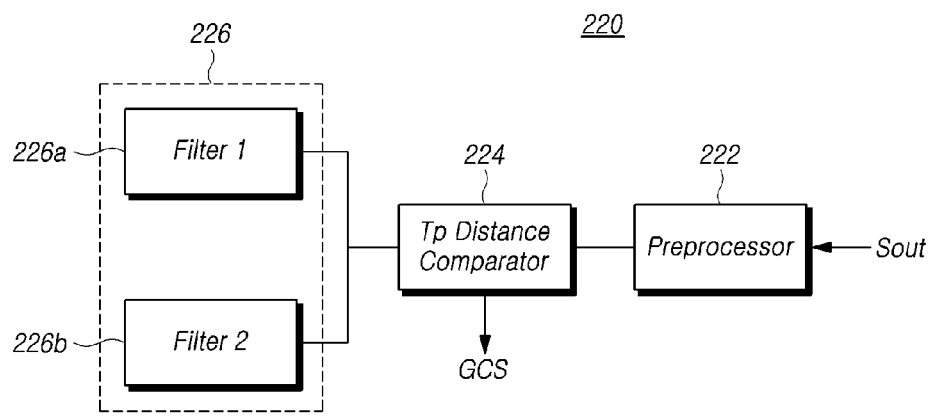
FIG. 11 illustrates a block diagram of the touch controller for controlling an amplification gain for the operational amplifier of a preamplifier in the touch display device according to aspects of the present disclosure.

FIG. 11 illustrates a block diagram of the touch controller for controlling an amplification gain for the operational amplifier of a preamplifier in the touch display device according to aspects of the present disclosure.

Referring to FIG. 11, the touch controller 220 constituting the touch driving circuit 200 in the touch display device 100 according to aspects of the present disclosure may include a touch sensing signal preprocessor 222, a touch peak value distance comparator 224, and a filter 226.

The touch sensing signal preprocessor 222 processes a digital touch sensing output signal Sout, which the touch sensing circuit 210 transmits by amplifying the touch sensing signal TSS, in order to detect the touch presence or touch coordinates.

For example, the touch sensing signal preprocessor 222 compares the sum of the digital touch sensing output signal Sout and the intensity of each digital touch sensing output signal Sout to determine a single touch or a multi-touch. However, the method of processing the digital touch sensing output signal Sout in the touch sensing signal preprocessor 222 to determine a single touch or a multi-touch is not limited thereto and may be variously changed.

The touch peak value distance comparator 224 extracts a plurality of single touch sensing data having a touch peak value from the data processed in the touch sensing signal preprocessor 222, and compares the positions of the touch peak values from each single touch sensing data.

In this case, the touch peak value distance comparator 224 compares the distance of touch peak values to a predetermined reference distance with respect to single touch sensing data located at adjacent positions.

When the distance of touch peak values between adjacent single touch sensing data is greater than the predetermined reference distance, it may be determined as a multi-touch by two fingers. However, the distance of touch peak values between adjacent single touch sensing data is smaller than the predetermined reference distance, the gain control signal GCS is transmitted to the touch sensing circuit 210 to increase the amplification gain of the touch sensing circuit 210 for determining a wide single touch or a multi-touch.

When the gain control signal GCS generated by the touch peak value distance comparator 224 is transmitted to the touch sensing circuit 210, the touch sensing circuit 210 is, for example, may process the amplification gain of the touch sensing signal TSS transmitted from the display panel 110 in the next frame by increasing it.

The filter 226 is a part for removing noise from the data transmitted from the touch peak value distance comparator 224, and may include one filter. However, the filter 226 may include a plurality of filters 226a, 226b which apply different noise removal algorithms according to the amplification gain applied to the touch sensing circuit 210.

For example, when the amplification gain of the touch sensing circuit 210 is low, noise may be removed through an average filter, and when the amplification gain of the touch sensing circuit 210 is high, the noise may be removed through a median filter.

In the above, it illustrated a case where the filter 226 is located at the rear of the touch peak value distance comparator 224 as an example, but in some cases, the filter 226 may be connected to the touch sensing signal preprocessor 222 and, the touch peak value distance comparator 224 may be connected to the rear of the filter 226.

Figure 12:
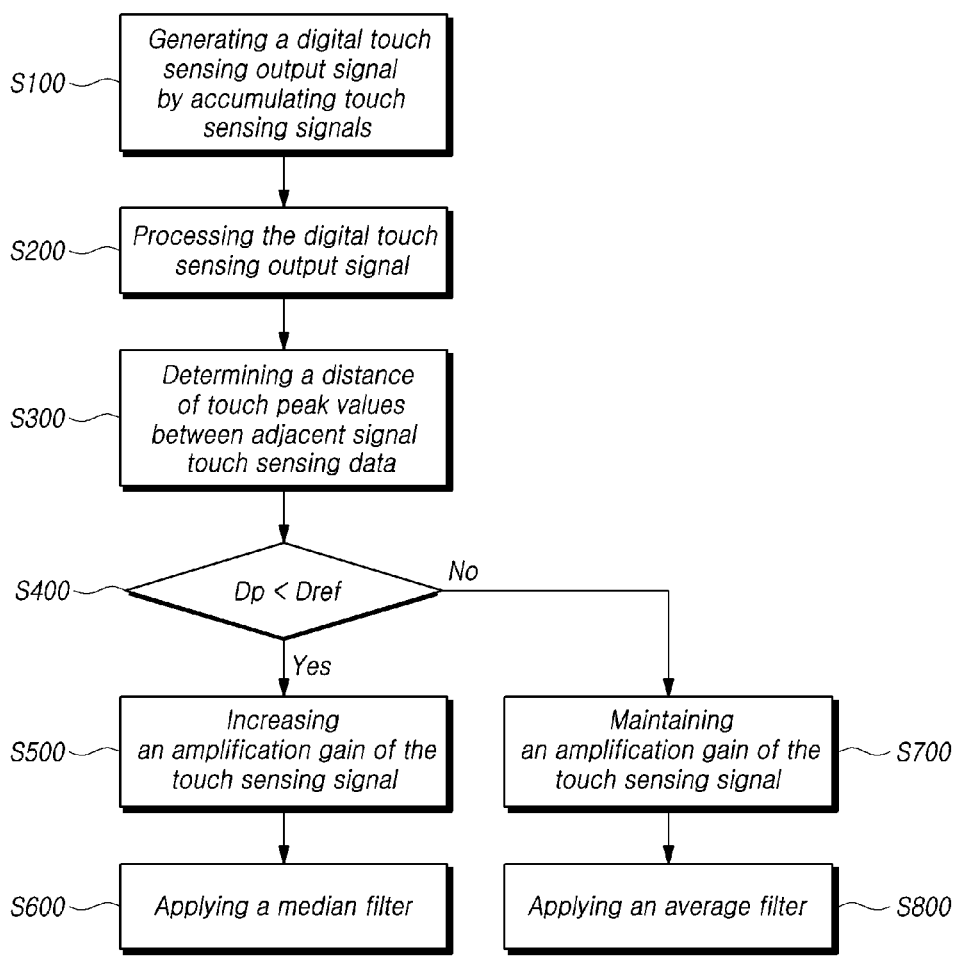
FIG. 12 illustrates a flowchart of a touch driving method according to aspects of the present disclosure.

FIG. 12 illustrates a flowchart of a touch driving method according to aspects of the present disclosure.

Referring to FIG. 12, the touch driving method according to aspects of the present disclosure may include a step S100 of generating a digital touch sensing output signal Sout by accumulating touch sensing signals TSS, a step S200 of processing the digital touch sensing output signal Sout, a step S300 of determining a distance of touch peak values between adjacent single touch sensing data, in according to a comparison result S400 of the distance Dp of the touch peak values and the reference distance Dref, a step S500 of increasing the amplification gain of the touch sensing signal and a step S600 of applying a median filter when the distance Dp of the touch peak values is smaller than the reference distance Dref, and a step S700 of maintaining the amplification gain of the touch sensing signal and a step S800 of applying an average filter when the distance Dp of touch peak values is greater than the reference distance Dref.

The step S100 of generating a digital touch sensing output signal Sout by accumulating touch sensing signals TSS is a process that the touch sensing circuit 210 generates the digital touch sensing output signal Sout using the touch sensing signal TSS transmitted from the display panel 110 through the preamplifier 212, the integrator 214, the sampling circuit 216, and the analog-to-digital converter ADC.

The step S200 of processing the digital touch sensing output signal Sout is a process that the touch sensing signal preprocessor 222 processes the digital touch sensing output signal Sout to detect a touch.

The step S300 of determining a distance of touch peak values between adjacent single touch sensing data is a process that the touch peak value distance comparator 224 extracts a plurality of single touch sensing data having touch peak values and compares a distance Dp of touch peak values between adjacent single touch sensing data to predetermined reference distance Dref.

The step S500 of increasing the amplification gain of the touch sensing signal when the distance Dp of the touch peak values is smaller than the reference distance Dref is a process that the touch peak value distance comparator 224 generates the gain control signal GCS to increase the amplification gain of the touch sensing circuit 210 according to a comparison result.

The step S600 of applying a median filter is a process that the median filter removes a noise when the amplification gain of the touch sensing circuit 210 is increased.

The step S700 of maintaining the amplification gain of the touch sensing signal when the distance Dp of touch peak values is greater than the reference distance Dref is a process that the touch peak value distance comparator 224 generates the gain control signal GCS to maintain the amplification gain of the touch sensing circuit 210 according to the comparison result.

The step S800 of applying an average filter is a process that the average filter removes a noise when the amplification gain of the touch sensing circuit 210 is low.

Figure 13:
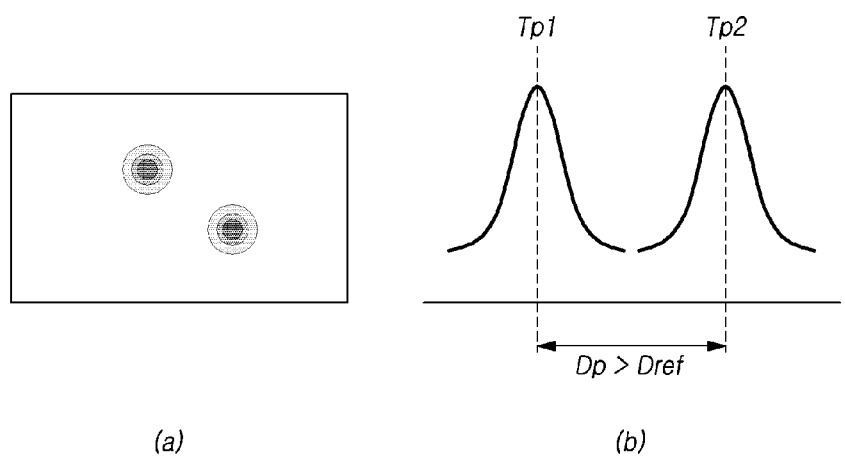
FIG. 13 illustrates a diagram where a distance of touch peak values is greater than a reference distance in a touch driving method according to aspects of the present disclosure.
Figure 14:
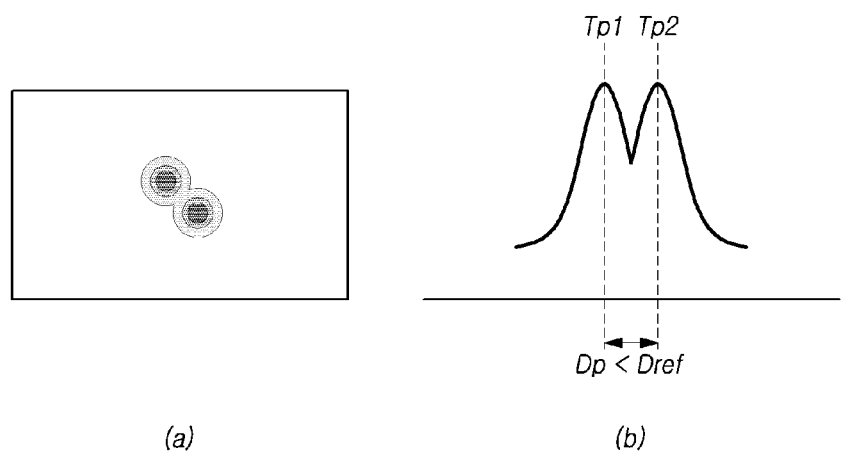
FIG. 14 illustrates a diagram where a distance of touch peak values is smaller than a reference distance in a touch driving method according to aspects of the present disclosure.
Figure 15:
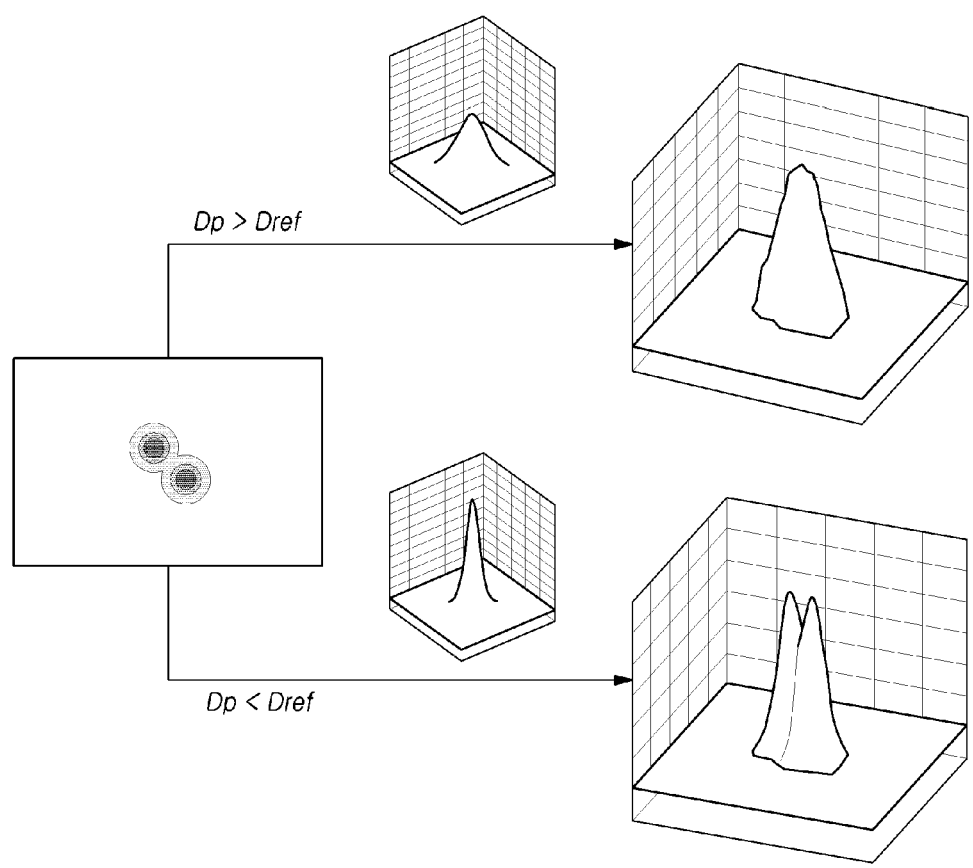
FIG. 15 illustrates a diagram where the amplification gain of the touch sensing circuit is changed according to the comparison result of a distance of the touch peak values and a reference distance in a touch driving method according to aspects of the present disclosure.

FIG. 13 illustrates a diagram where a distance of touch peak values is greater than a reference distance in a touch driving method according to aspects of the present disclosure. FIG. 14 illustrates a diagram where a distance of touch peak values is smaller than a reference distance in a touch driving method according to aspects of the present disclosure. FIG. 15 illustrates a diagram where the amplification gain of the touch sensing circuit is changed according to the comparison result of a distance of the touch peak values and a reference distance in a touch driving method according to aspects of the present disclosure.

Referring to FIG. 13 to FIG. 15, the touch driving method according to aspects of the present disclosure may include processes that the touch sensing circuit 210 generates a digital touch sensing output signal Sout by accumulating the touch sensing signal TSS transmitted from the display panel 110 and the touch controller 220 processes the digital touch sensing output signal Sout to detect a touch.

The touch controller 220 extracts single touch sensing data at an adjacent position from the processed digital touch sensing output signal, and determines the distance of the touch peak values between the adjacent single touch sensing data.

When the distance Dp of the touch peak values is greater than the reference distance Dref, the amplification gain of the touch sensing circuit 210 is maintained by determining a multi-touch.

On the other hand, when the distance Dp of the touch peak values is smaller than the reference distance Dref, the gain control signal GCS is generated to increase the amplification gain of the touch sensing circuit 210 because the touch may be an wide single touch or a multi-touch.

As described above, when the amplification gain of the touch sensing circuit 210 is increased, the touch peak value Tp of the digital touch sensing output signal Sout increases to a higher level. At this time, one touch peak value Tp appears even if the amplification gain is increased in the case of a wide single touch. On the other hand, the touch peak value Tp is divided into two because the amplification gain of the touch sensing circuit 210 increases in the case of a multi-touch. Therefore, it is possible to determine a multi-touch.

As described above, it is possible to determine a single touch or a multi-touch because it is easy to check the touch peak value Tp even though the touch reference value Tref is changed, if the amplification gain of the touch sensing circuit 210 is increased.

However, as described above, when the amplification gain of the touch sensing circuit 210 is increased, noise may also be increased. Accordingly, filter for removing noise such as a median filter may be used to effectively remove the noise.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:
1. A touch display device comprising:
a display panel including a plurality of touch electrodes, and a plurality of touch lines;
a touch sensing circuit configured to generate a digital touch sensing output signal by accumulating touch sensing signals transmitted from the plurality of touch electrodes through the plurality of touch lines; and a touch controller configured to control an amplification gain of the touch sensing circuit by extracting a plurality of single touch sensing data having touch peak values from the digital touch sensing output signal and by comparing a distance of touch peak values between adjacent single touch sensing data with a predetermined reference distance.

2. The touch display device according to claim 1, wherein the touch sensing circuit includes:

a preamplifier having an operational amplifier to which the touch sensing signal supplied to an inverting input terminal and a reference voltage supplied to a non-inverting input terminal, a plurality of feedback capacitors connected in parallel between the inverting input terminal and an output terminal of the operational amplifier, and a gain control switch to select the plurality of feedback capacitors;

an integrator having a plurality of switches and a plurality of capacitors in order to accumulate an output signal of the preamplifier;

a sampling circuit configured to transmit an output signal of the integrator; and an analog-to-digital converter configured to convert an output signal of the sampling circuit into the digital touch sensing data.

3. The touch display device according to claim 2, wherein the reference voltage is a fixed value or a variable signal.

4. The touch display device according to claim 3, wherein the reference voltage is the same signal as a load free driving signal supplied to the plurality of touch electrodes.

5. The touch display device according to claim 3, wherein the amplification gain of the touch sensing circuit is larger than the variation of the reference voltage.

6. The touch display device according to claim 1, wherein the touch controller includes:

a touch sensing signal preprocessor configured to process the digital touch sensing output in order to detect a touch; and a touch peak value distance comparator configured to extract a plurality of single touch sensing data having touch peak values from the data processed in the touch sensing signal preprocessor, and control the amplification gain of the touch sensing circuit according to a distance of the touch peak values between adjacent single touch sensing data.

7. The touch display device according to claim 6, wherein the touch peak value distance comparator is configured to increase the amplification gain of the touch sensing circuit when the distance of touch peak values between adjacent single touch sensing data is smaller than a reference distance.

8. The touch display device according to claim 7, wherein the touch peak value distance comparator is configured to increase the amplification gain of the operational amplifier by selecting a feedback capacitor having a large capacity from among the plurality of feedback capacitors connected to the operational amplifier when the distance between the touch peak values of the adjacent single touch sensing data is greater than a reference distance.

9. The touch display device according to claim 6, wherein the touch peak value distance comparator is configured to maintain the amplification gain of the touch sensing circuit when the distance of touch peak values between adjacent single touch sensing data is greater than a reference distance.

10. The touch display device according to claim 6, wherein the touch controller further includes at least one filter configured to remove noise from data transmitted from the touch peak value distance comparator.

11. The touch display device according to claim 10, wherein the touch controller uses a median filter when the distance of the touch peak values between adjacent single touch sensing data is smaller than a reference distance.

12. The touch display device according to claim 10, wherein the touch controller uses an average filter when the distance of the touch peak values between adjacent single touch sensing data is greater than a reference distance.

13. A touch driving circuit comprising:

a touch sensing circuit configured to connect to a plurality of touch electrodes in a display panel through a plurality of touch lines and generate a digital touch sensing output signal by accumulating touch sensing signals transmitted from the plurality of touch electrodes through the plurality of touch lines; and a touch controller configured to control an amplification gain of the touch sensing circuit by extracting a plurality of single touch sensing data having touch peak values from the digital touch sensing output signal and by comparing a distance of touch peak values between adjacent single touch sensing data to a predetermined reference distance.

14. The touch driving circuit according to claim 13, wherein the touch sensing circuit includes:

a preamplifier having an operational amplifier to which the touch sensing signal supplied to an inverting input terminal and a reference voltage supplied to an non-inverting input terminal, a plurality of feedback capacitors connected in parallel between the inverting input terminal and an output terminal of the operational amplifier, and a gain control switch to select the plurality of feedback capacitors;

an integrator having a plurality of switches and a plurality of capacitors in order to accumulate an output signal of the preamplifier;

a sampling circuit configured to transmit an output signal of the integrator; and an analog-to-digital converter configured to convert an output signal of the sampling circuit into the digital touch sensing data.

15. The touch driving circuit according to claim 13, wherein the touch controller includes:

a touch sensing signal preprocessor configured to process the digital touch sensing output in order to detect a touch; and a touch peak value distance comparator configured to extract a plurality of single touch sensing data having touch peak values from the data processed in the touch sensing signal preprocessor, and control the amplification gain of the touch sensing circuit according to a distance of the touch peak values between adjacent single touch sensing data.

16. The touch driving circuit according to claim 15, wherein the touch peak value distance comparator is configured to increase the amplification gain of the touch sensing circuit when the distance of touch peak values between adjacent single touch sensing data is smaller than a reference distance.

17. The touch driving circuit according to claim 15, wherein the touch peak value distance comparator is configured to maintain the amplification gain of the touch sensing circuit when the distance of touch peak values between adjacent single touch sensing data is greater than a reference distance.

18. A touch driving method for detecting touch presence or touch coordinates by receiving touch sensing signals from a plurality of touch electrodes disposed on a display panel, comprising:
- generating a digital touch sensing output signal by accumulating the touch sensing signals;
- processing the digital touch sensing output signal to detect a touch;
- extracting a plurality of single touch sensing data having touch peak values from the processed data, and determining a distance of touch peak values between adjacent single touch sensing data;
- comparing the distance of touch peak values between adjacent single touch sensing data to a reference distance; and
- increasing an amplification gain of the touch sensing signal when the distance of touch peak values between adjacent single touch sensing data is smaller than the reference distance.

19. The touch driving method according to claim 18 further comprising maintaining the amplification gain of the touch sensing signal when the distance of touch peak values between adjacent single touch sensing data is greater than the reference distance.

20. The touch driving method according to claim 18 further comprising applying a median filter for removing noise of the digital touch sensing output signal when the distance of touch peak values between adjacent single touch sensing data is smaller than the reference distance.

* * * * *